United States Patent [19]

White

[11] Patent Number: 4,742,852

[45] Date of Patent: May 10, 1988

[54] FEEDER

[75] Inventor: Harold R. White, New Lenox, Ill.

[73] Assignee: Alar Engineering Corporation, Mokena, Ill.

[21] Appl. No.: 9,887

[22] Filed: Feb. 2, 1987

[51] Int. Cl.⁴ .................................................. B65B 3/08
[52] U.S. Cl. ...................................... 141/256; 198/659
[58] Field of Search ................................ 141/250–284; 198/659

[56] References Cited

U.S. PATENT DOCUMENTS

| | | | |
|---|---|---|---|
| 2,438,637 | 3/1948 | Jansen | 198/659 |
| 2,652,954 | 9/1953 | Nowak | 198/659 |
| 3,707,224 | 12/1972 | Rastoin | 198/659 |

Primary Examiner—Houston S. Bell, Jr.
Attorney, Agent, or Firm—Hill, Van Santen, Steadman & Simpson

[57] ABSTRACT

A self-cleaning feeder for particulate material, such as dry lime powder, utilizes a spaced coil helical spring rotating in an upright annular passage between a pair of pipes to convey the material from a stock pile source, such as a drum container supporting the feeder in upright position, to an outlet in controlled amounts. The coil spring projects into the stock pile and has a laterally extended tail or finger stirring or agitating the material to maintain it in contact with the spring. The inner pipe is bottomed on a plate resting on the bottom of the supply container and the outer pipe is carried above the plate by a spider stand on the plate. An inclined chute or tray supported from the outer pipe receives the material to slide it into a tank or apparatus. The top of the inner pipe provides a bottom bearing for a motor driven rotating drive rod receiving the spring therearound and a transverse bolt and nut assembly mounted through the drive rod clamps selected adjacent coils of the spring to the rod to rotate the spring with the rod. The spring can unwind and rewind in operation to free its coils and be raised or lowered on the rod to compensate for any change in length of the spring as it is loaded by the material so that the tail or finger of the spring will ride on or closely adjacent the mounting plate. An electric drive is coupled to the top of the drive rod being carried on a bracket supported on the outer pipe. A solid cylindrical rod may be used in place of the inner pipe.

19 Claims, 2 Drawing Sheets

FEEDER

BACKGROUND OF THE INVENTION

1. Field of the Invention

This invention relates to the art of feeding particulate bulk material such as dry powder from a stock pile source in a container to an outlet at a desired rate and specifically deals with an inexpensive simple portable self-cleaning feeder utilizing a conventional open coil helical spring rotating between concentric spaced pipes to stir powder material in a low level pile and deliver it to a high level outlet.

2. Description of the Prior Art

Conventional screw conveyors have fixed vanes on a central shaft or hub providing a heavy rotating assembly which frequently becomes clogged especially when conveying sticky or hygroscopic materials. It would therefore be an improvement in this art to provide a self-cleaning feeder made from conventional inexpensive pipe and coil spring components providing a stationary annular passage in which the spring rotates to convey the material from an inlet at one end of the pipes and an outlet at the other end of the pipes. It would be a further specific improvement in this art to simultaneously agitate or stir the material in a stock pile supplying the feeder. A still further improvement would be to provide a portable feeder carried by a supply container adapted to be placed adjacent a receiving tank.

SUMMARY OF THE INVENTION

According to this invention a feeder or conveyor for particulate materials such as dry powdered lime, is constructed from inexpensive conventional parts including an inner pipe, an outer pipe and a coiled helical spring. The pipes are spaced concentrically to define an annular passageway therebetween. A conventional open coil helical spring extends freely through the passageway. The inner pipe is supported upright on a mounting plate. The outer pipe is carried on a spider stand resting on this plate so that its bottom end is above the plate. The spring extends to the bottom plate and has a few of its coils exposed above the plate. One or more of the endmost coils are bent to form a radiating tail or finger riding on or close to the mounting plate.

The upper portion of the outer pipe mounts an upright plate extending above the pipe. This plate supports an inclined chute or tray communicating with the open top of the outer pipe. The plate also supports a drive motor and reduction gear assembly to which is coupled a drive rod having a bottom bearing riding in the top end of the inner pipe which terminates above the outer pipe. The coil spring extends beyond both pipes and through the bottom of the chute or tray and has its upper coils releasably clamped to the drive rod by a bolt assembly extending between a pair of coils. The coil spring is thus fixed to the drive rod to rotate therewith and its height is easily adjusted so that as it expands or contracts in length during use it can be raised or lowered to maintain its bottom finger or tail freely riding freely adjacent the mounting plate for the inner pipe.

The top end of the outer pipe is inclined to conform with the bottom of the chute or tray surrounding the pipe.

The mounting plate is preferably positioned on the bottom of a container, such as a drum or barrel, forming the stock pile for the material to be fed. A cover or lid of the container surrounds the outer pipe to hold the assembly upright.

The spider stand for the outer pipe in the drum does not interfere with maintaining the bottom mounting plate for the inner pipe covered with the material in the drum so that the free bottom end coils of the spring are always in full contact with the material. The extending tail or finger of the spring stirs up the material to prevent any hang up in the stock pile for the feeder.

The feeder is light in weight, easily handled, self-cleaning, conveniently located where needed, and uses a container for the material to be fed as a support.

The coil spring in its free or unloaded horizontal position freely fits in the annular passageway between the telescoped pipes. Thus, its outer diameter is less than the inner diameter of the outer pipe and its inner diameter is greater than the outer diameter of the inner pipe. Clearance gaps on the order of ¼ inch are preferred. The spring is rotated in the same direction as the coils are wound. Thus, a clockwise wound spring will be rotated clockwise. When the assembly is raised to an upright position with the spring suspended in the passageway from its uper end, it will stretch or tend to stretch lengthwise reducing its diameter to engage the inner pipe. Then as the material being lifted fills the spaces or gaps between the coils its load on the coils will further stretch the spring while decreasing the diameter of the coils. The reduction of the diameter of the coils eventually closes the gap between the inner pipe and the coils causing the coils to wipe the inner pipe. However, as the stretched spring is rotated in the direction in which its coils are wound, the loaded coils will resist the rotation causing the coils to unwind and increase in diameter closing the gap between the coils and the outer pipe and eventually wiping the coils on the outer pipe. The unwinding of the spring builds up a torsion load in the coils which is increased when they are expanded into contact with the outer pipe. This torsion load eventually exceeds the stretching load on the spring whereupon a reaction will occur causing the coils of the spring to snap or jerk back into wiping engagement with the inner pipe. An alternating wiping of the inner and outer walls of the annular passageway through which the powder is being conveyed thus occurs to keep both the surfaces of the passageway and the surfaces of the coils freed from any powder which tends to hang up or stick thereon. In effect the coils of the spring alternately contract and expand as they are loaded and stretched by the powder and then unwound and expanded by the torsion force created by rotation. The easily adjusted clamp attaching the spring to the drive rod compensates for variations in spring length under different operating condition.

The winding and unwinding of the spring with the snap or jerk release when the unwinding torsion load exceeds the winding stretching load caused by the powder, will also jerk or whip the tail of the spring to insure a constant supply of powder from the stock pile into contact with the exposed coils of the spring.

An electrical circuit for the motor preferably includes a speed control and a timer so that the rate of feed and the duration of the feed can be accurately controlled.

It is then an object of this invention to provide a simple inexpensive feeder or conveyor utilizing a conventional open coil helical spring rotating between inner and outer pipes to convey material.

Another object of this invention is to provide a light weight, portable upright feeder for dry powders and the like supported by a drum or barrel containing the powders and having a rotating open coil helical spring exposed in the bottom of the container and extending between inner and outer pipes to convey the material between its coils to an outlet as it is rotated between the pipes.

Another object of the invention is to provide a portable upright self-cleaning feeder for dry powders, such as lime, utilizing an open coil helical spring rotating in an annular passage to lift the powder from a low level container to a high level outlet.

Another object of the invention is to provide a feeder having a coil spring rotating between pipes and driven at a controlled speed for a controlled duration to feed powder from a drum like container to a chute supplying a reaction tank or the like.

Other and further objects of this invention will become apparent to those skilled in this art from the following detailed description of the annexed sheets of drawings which illustrate a preferred mode embodiment of the invention.

ON THE DRAWINGS

AS SHOWN ON THE DRAWINGS

Figure 1:
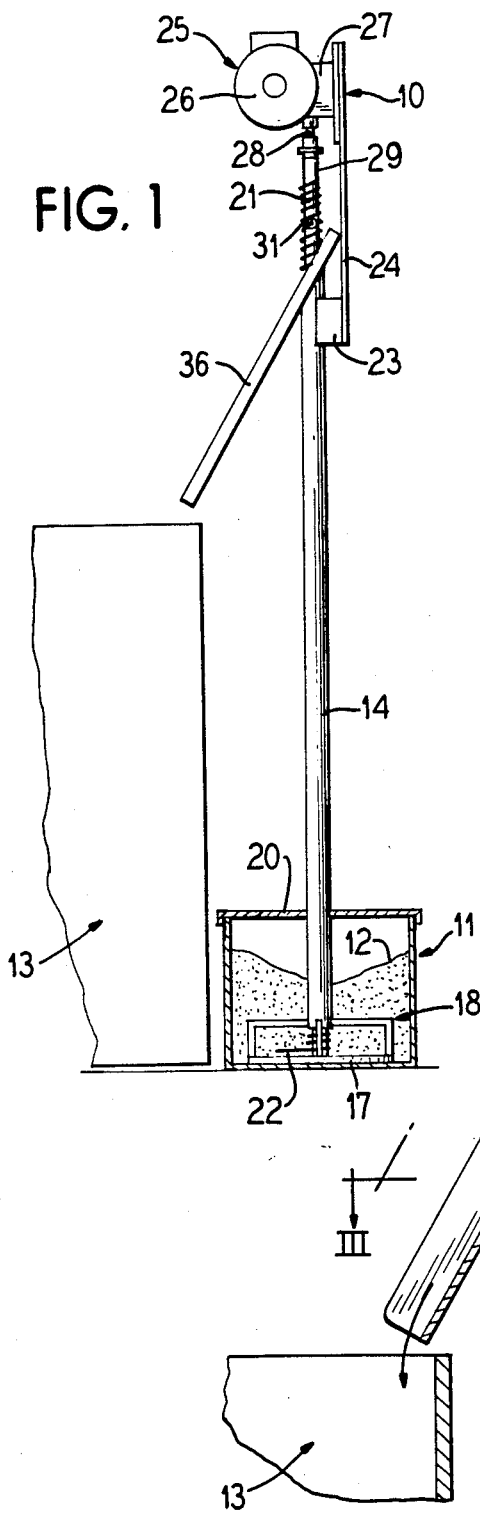
FIG. 1 is a side elevational view of the feeder with a supporting supply container in section and showing a portion of a receiving tank.
Figure 2:
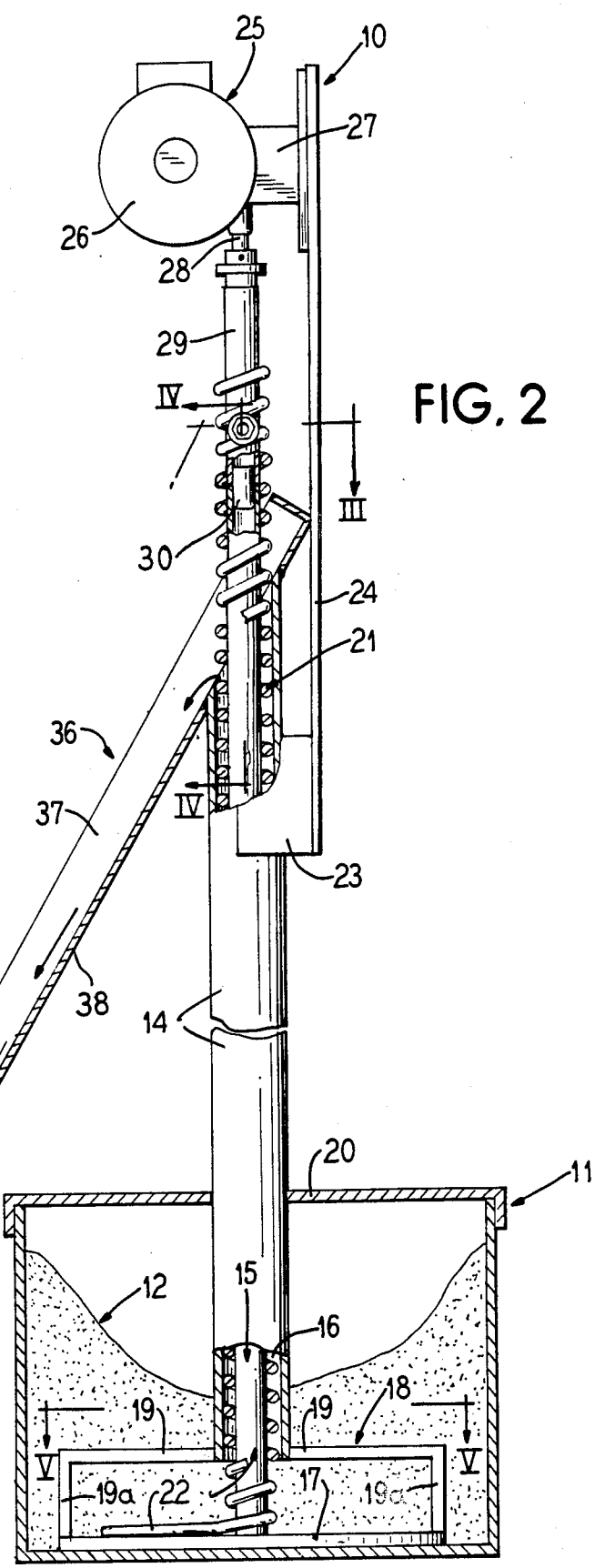
FIG. 2 is a view of the feeder similar to FIG. 1 on a larger scale and with parts broken away.

The feeder 10 of FIGS. 1 and 2 is mounted in and projects upright from a container drum or barrel 11 to feed particulate matter such as lime powder 12 to the top of a tank 13 at a desired rate and for a desired duration.

The feeder 10 is composed of a pair of pipes including an outer cylindrical pipe 14 and an inner cylindrical pipe 15 in spaced concentric relation providing an annular passage 16 therebetween along the entire length of the telescoped pipes. The pipes 14 and 15 can be standard galvanized iron pipes or copper or plastics material tubes. The inner pipe 15 can be in the form of a solid rod.

The inner pipe 15 is mounted upright on a flat base plate 17 freely fitting in the container 11 and resting on the bottom thereof.

The outer pipe 14 is supported on a spider leg base or stand 18 having four rod-like legs 19 radiating from the bottom of the pipe 14 and having downturned ends 19a resting on the plate 17 at the peripheral edge of the plate. These downturned ends 19a are preferably secured to the plate. The top face of the plate is thus fully exposed to the stock pile of powder 12 in the container 11. The container has a cover or lid 20 snugly embracing the outer pipe 14 to cooperate with the spider stand 18 for holding the pipe in fixed upright position.

A helical coil spring 21 extends through the passageway 16 in free guided relation with the inner cylindrical surface of the outer pipe 14 and the outer cylindrical surface of the inner pipe 15. The coils of this spring 21 are spaced apart thus defining a spiral chamber to lift material through the passage 16.

The bottom of the spring 21 extends beyond the bottom of the pipe 14 leaving a few coils of the spring exposed to the powder 12 in the container 11. The bottom end of the spring, however, is uncoiled providing a laterally extending tail or finger 22 riding on or closely spaced above the base plate 17. This finger or tail 22 agitates or stirs the powder 12 at the bottom of the container 11 to insure intimate contact of the powder with the exposed bottom end coils of the spring.

The upper portion of the pipe 14 has a bracket 23 secured thereon as by welding and this bracket carries an upright plate 24 projecting above the top of the pipe. The top end of this plate 24 mounts an electric motor drive assembly 25 including an electric motor 26 and reduction gearing in a housing 27 from which depends a drive shaft 28.

A drive rod tube 29 is coupled to the shaft 28 and depends therefrom to the top of the inner pipe 15. The bottom end of this tube 29 fixedly mounts a spindle or plug 30 projecting into the top end of the inner pipe 15. The spindle is preferably composed of nylon or other plastics material thus providing a bearing riding in the top end of the pipe 15 and holding it concentric with the upper end of the annular passage 16.

The top end of the spring 21 is wrapped around the drive rod tube 29 and the spring is clamped to the tube by a bolt assembly 31 including a bolt 32 having a shank extended through transverse holes in the tube 29, a head 33 on one end of the shank 32, a nut 34 threaded on the other end of the shank 32 and washers 35 on the shank backed by the head 33 and nut 34 engaging a pair of adjacent coils of the spring 21. Tightening of the nut 34 clamps these coils between the washers 35 and the drive tube 29 thus fixing the spring to the tube for rotation therewith. The vertical position of the spring relative to the pipes 14 and 15 is thus easily adjusted by loosening the bolt 34 and moving the spring relative to the tube 29 to raise or lower it so that the tail or finger 22 will ride close to the mounting plate 17. In operation, the spring 21 will stretch and reduce in diameter due to its suspended weight and the load of the powder between the coils of the spring in the annular passage 16. Then the rotation of the stretched spring unwinds and expands the coils building up torsion until the twisting force exceeds the stretching load whereupon the spring will jerk or snap back to a stretched reduced diameter condition. Easy adjustment of the vertical position of the spring is desirable to suit varying operating conditions.

A chute or tray 36 is suspended from the pipe 14 in inclined relation and can be fixedly welded to the upper end of the pipe 14. This chute 36 has an upturned periphery 37 surrounding the sides and top end of a flat bottom 38. This bottom 38 is apertured to receive the top end edge of the pipe 14. This top end edge of the pipe 14 is inclined into conformity with the bottom 38 of the chute. The top end of the inner pipe 15 terminates above the top end of the outer pipe 14 so that the spindle 30 rides in the top end of the pipe 15 above the confines of the outer pipe 14.

Figure 3:
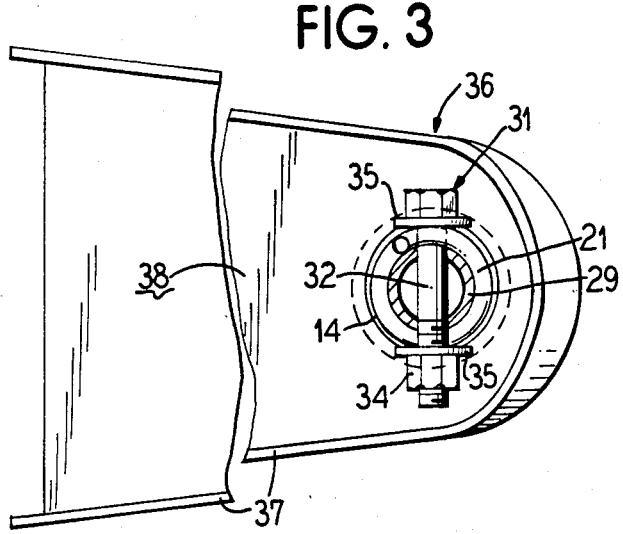
FIG. 3 is a transverse cross-sectional view along the line III—III of FIG. 2 with parts broken away.
Figure 4:
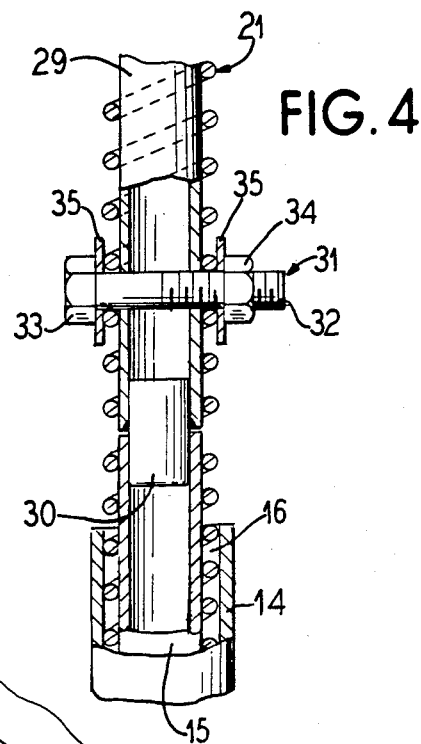
FIG. 4 is a longitudinal sectional view along the line IV—IV of FIG. 2 on a larger scale.
Figure 5:
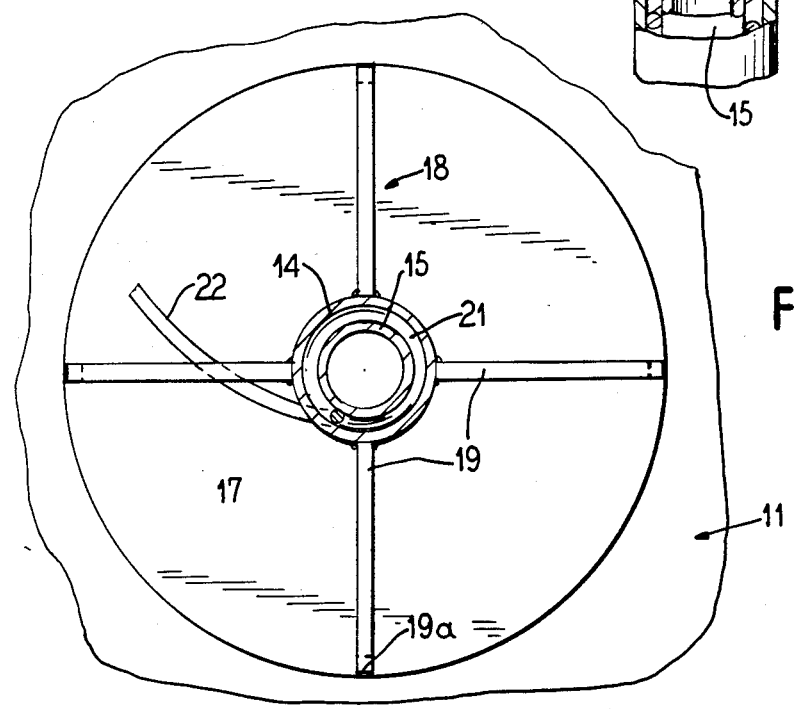
FIG. 5 is a transverse sectional view along the line V—V of FIG. 2 on a larger scale.

As shown in FIG. 3, the sidewall 37 of the chute 36 does not cover the bottom end of the chute so that powder sliding down the chute is freely discharged out of the bottom end of the chute into the top of the tank 13. The degree of inclination of the chute is sufficient to insure free sliding of the powder over the bottom 38.

Figure 6:
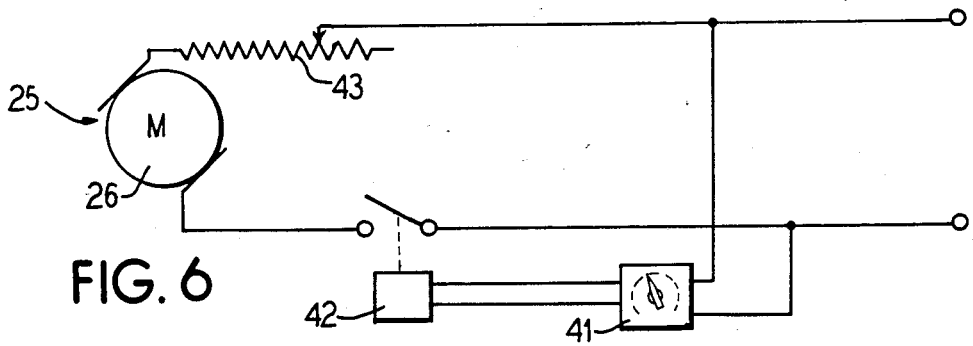
FIG. 6 is a circuit diagram for controlling the speed and duration of the motor drive for the feeder.

As illustrated in FIG. 6, the motor 26 of the drive 25 is energized in an electrical circuit 40 including a timer 41 controlling a relay switch 42 so that the circuit can be closed to drive the motor for a specified duration. In addition a variable speed control 43 is provided in the circuit to regulate the rate of the drive. In this manner the spring 21 will rotate at a controlled speed and for a controlled duration to feed the powder 12 from the container 11 to the tank 13.

In operation, the spring 21 suspended from its upper end is driven clockwise so that its clockwise wound coils will act as an auger to lift the powder through the passageway 16. Since the coils initially rotate freely in the passageway with clearance gaps between the outer diameter of the inner pipe and the inner diameter of the coils and between the outer diameter of the coils and the inner diameter of the outer pipe, the load or weight of the powder on the coils coupled with the weight of the top suspended spring itself stretches the spring thereby reducing the diameter of the coils and causing them to wipe the inner pipe. This stretching and reduction in diameter of the spring is counteracted by the torsion load imposed on the spring by the driving motor which rotates the spring in the direction of winding of the coils. This torsion load tends to unwind the spring increasing the diameter of the coils and causing them to wipe the outer pipe. When the torsion load exceeds the stretching load the spring will jerk back away from the outer pipe whereupon the coils will wipe the inner pipe. The jerking action shakes loose any powder which might tend to stick to the coils and walls of the passageway. In addition, since the spring is also resilient in a lengthwise direction, it will elongate and contract in length due to variations in load thus varying the spacing of the coils and preventing the powder from packing. The jerking of the tail of the spring adds to the stirring of the powder in the stock pile and aids the feeding of the powder to the exposed end coils of the spring.

While the alternating reduction and expanding of the spring diameter produces the desired self-cleaning and agitating features and may cause variations in powder discharge, it does not over a period of time affect the feed rate. For example, the feed rate varies less than 1 percent in runs of 10 minutes or more.

The length or height of the feeders of this invention may vary to suit conditions. The feeder may extend vertically, horizontally, or at an angle to traverse the space between the supply stock pile and the delivery outlet. The diameters of the pipes and the passageway gap therebetween may also vary widely to provide a desired capacity for the feeder. The coil spring should be sized to fit freely in the passageway and be sufficiently resilient to contract into wiping engagement with the inner wall of the passageway and then expand to wiping engagement with the outer wall of the passageway. The spacing of the coils may also vary widely to suit conditions.

In a particular preferred mode embodiment, the pipes are about 4 to 20 feet long, are mounted vertically upright, the outer pipe has an inner diameter of 1½ to 5 inches, the inner pipe has an outer diameter of 1 to 4 inches, the width or gap of the passageway between the pipe is ¼ to 1 inches, the spring has a length to project beyond both ends of the pipes, a free inner diameter of 1¼ to 4 inches, a free outer diameter of 1½ to 5 inches, a free spacing between the coils of ¼ to 1 inches and a spring rate of ½ to 12 pounds. A variable speed drive motor may have a rate of 10 to 100 revolutions per minute. It will, of course, be understood that the invention is not limited to these parameters.

From the above descriptions it will be understood that this invention provides a simple inexpensive feeder or conveyor for particulate matter, especially dry powders. The feeder is self cleaning, formed from conventional components and simultaneously stirs the powder in the stock pile while delivering the material from the stock pile. The feeder is portable and conveniently fits in and is supported by a barrel or drum containing the material to be fed.

I claim as my invention:

1. A self cleaning feeder which comprises elongated spaced concentric means defining an annular passage therebetween along the length thereof, said passage having an inlet and an outlet longitudinally spaced from the inlet, an elongated spaced coil helical wound stretchable spring extending freely through said passage communicating with said inlet and said outlet, means suspending said spring for stretching and contracting in said passage, means rotating said suspended spring in said passage in the direction of winding of the coils to act as an auger conveying material through the passage from the inlet to the outlet, and said spring having a rate causing the rotating coils loaded by the material to alternately contract into wiping engagement with the inner wall of the passage and expand into wiping engagement with the outer wall of the passage.

2. A portable feeder supported by a container housing particulate material and adapted to be placed adjacent a receptacle for the material which comprises means carried by said container defining an annular passage along the length thereof with an open inlet in the container and an open outlet communicating with the adjacent receptacle, an elongated spaced coil helical wound spring in said passage having coils exposed to the inlet and outlet, and means rotating said spring in the direction of winding of the coil; to convey material between the coils from the container to the receptacle.

3. A self-cleaning device for conveying material which comprises means defining an elongated annular passage having an inlet and an outlet, a resilient elongated wound coil spring extending freely through said passage with end coils exposed to said inlet and said outlet, means feeding material to the exposed coils at the inlet, means discharging said material from the exposed coils at the outlet, means rotating said spring in the direction of the winding of the coils, said material fed to the coils stretching the spring and reducing the diameter of the coils into wiping engagement with the inner surface of the annular passage, said means rotating the loaded stretch reduced diameter coils creating a torsion load unwinding and expanding the coils into wiping engagement with the outer surface of the passage, and said spring having a degree of resilience sufficiently to jerk back to said reduced diameter when the rotating torsion load thereon exceeds the stretching load imposed thereon by the material.

4. The feeder of claim 1 wherein said elongated spaced concentric means comprises a pair of pipes.

5. The feeder of claim 1, wherein the helical spring extends freely through the passage, a container supports the concentric means defining the passage in an upright position and a tail on the spring feeds material from the container to the inlet.

6. The feeder of claim 1 wherein the spring has a clearance gap with the walls of the passage in its free state and alternately expands and contracts into wiping engagement with the inner and outer walls of the passage as it conveys the material through the passage.

7. The feeder of claim 1 wherein the spring has end coils exposed beyond the passage with a stirrer tail extending laterally from the exposed coils in the inlet and a drive shaft extending into the exposed coils at the outlet.

8. The feeder of claim 1 wherein the means rotating the spring has a depending drive shaft suspending the spring in the passage.

9. The feeder of claim 1 wherein the elongated spaced concentric means defining the annular passage include an outer pipe supported upright from a container housing the material to be conveyed and an inner pipe supported on the bottom of the container.

10. The feeder of claim 1 wherein the annular passage is defined by inner and outer pipes and the means rotating the spring has a drive shaft rotatably supported in the inner pipe.

11. The feeder of claim 8 wherein the drive shaft has coils of the spring therearound and carries a clamp securing coils to the shaft for corotation therewith.

12. The feeder of claim 1 wherein the spring has coils projecting beyond the passage at the inlet and a stirrer tail projects laterally therefrom into the material.

13. The feeder of claim 2 wherein the means defining the annular passage are a pair of elongated spaced concentric pipes with an inner pipe bottomed on the container and an outer pipe having a bottom end spaced above the bottom of the container.

14. The feeder of claim 2 wherein the coils exposed to the inlet have a laterally extending tail at the bottom of the container.

15. The feeder of claim 2 wherein the coils exposed to the outlet are releasably clamped to the means rotating the spring.

16. The feeder of claim 2 wherein the outlet discharges to an inclined chute feeding the material to the receptacle.

17. The feeder of claim 2 wherein the means rotating the spring is a variable speed electric motor drive.

18. The device of claim 3 wherein the coil spring in its free unloaded condition has clearance gaps between the inner and outer walls of the passage and said gaps alternately open and close as the spring is loaded and rotated.

19. The device of claim 3, wherein the coil spring is suspended freely in the passage.

* * * * *